Figure 3:
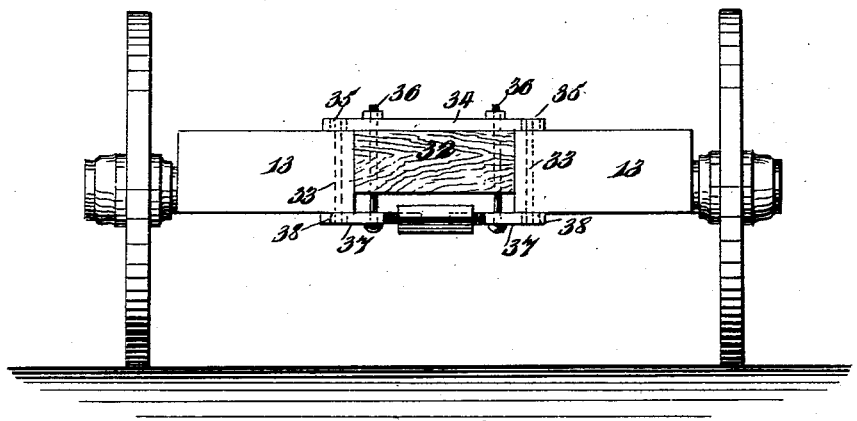

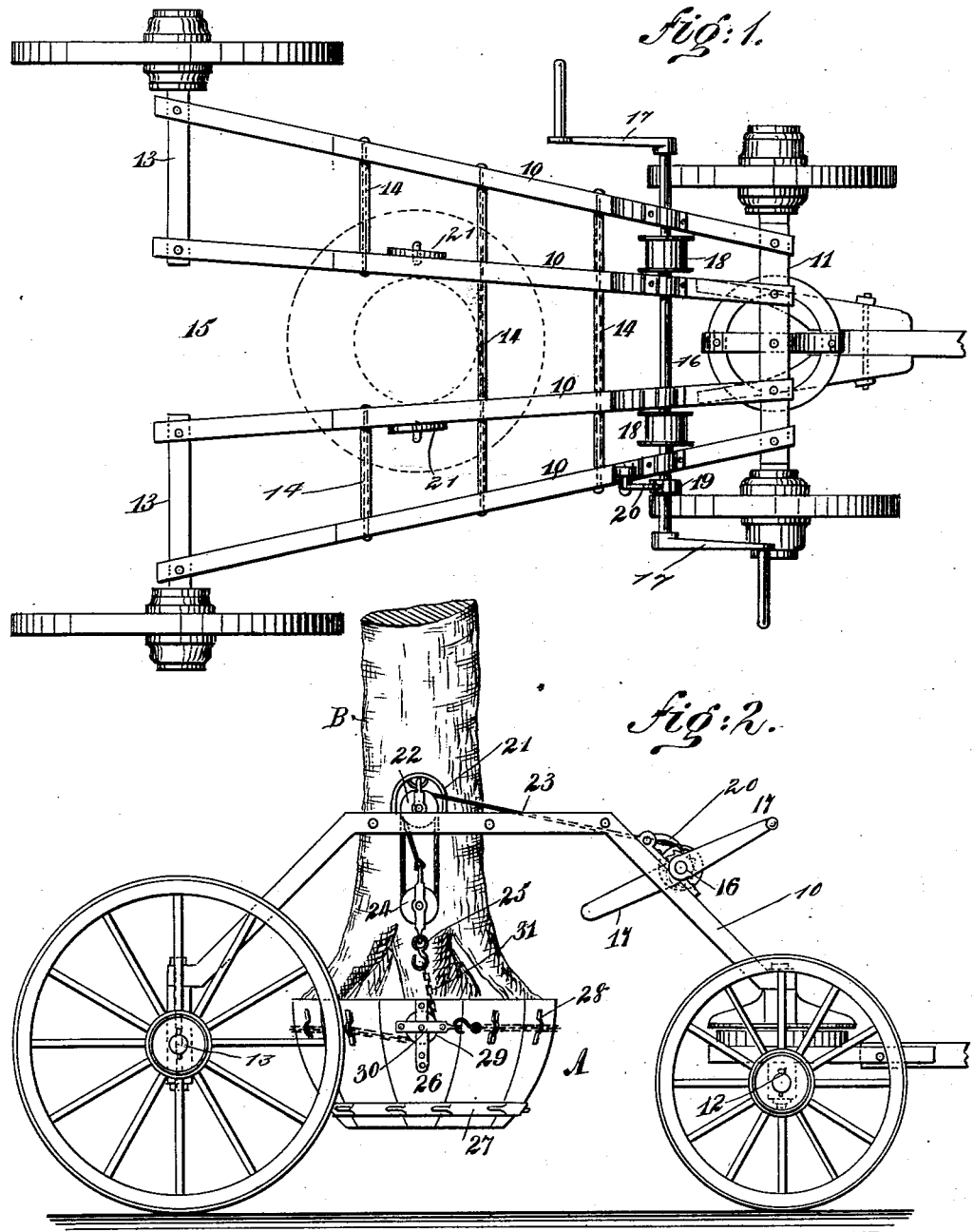

(No Model.)
2 Sheets—Sheet 2

C. O. HALLING.
DEVICE FOR TRANSPORTING TREES.

No. 569,042. Patented Oct. 6, 1896.

WITNESSES:
Chas. Nicol.
J. Edw. Acker

INVENTOR
C. O. Halling.
BY Munn & Co.
ATTORNEYS.

UNITED STATES PATENT OFFICE.

CHARLES O. HALLING, OF MINNEAPOLIS, MINNESOTA, ASSIGNOR OF ONE-HALF TO GILBERT AMONSEN, OF SAME PLACE.

DEVICE FOR TRANSPORTING TREES.

SPECIFICATION forming part of Letters Patent No. 569,042, dated October 6, 1896.

Application filed August 14, 1895. Serial No. 559,252. (No model.)

*To all whom it may concern:*

Be it known that I, CHARLES O. HALLING, of Minneapolis, in the county of Hennepin and State of Minnesota, have invented a new and Improved Device for Transporting Trees, of which the following is a full, clear, and exact description.

My invention relates to an improvement in devices for transporting trees; and the object of the invention is to provide a simple and conveniently-operated truck by means of which trees of large growth may be readily and safely transported from one place to another; and the invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved truck or vehicle. Fig. 2 is a side elevation thereof, a tree being shown in position to be carried, in said view; and Fig. 3 is an end view of the improved vehicle, illustrating the manner in which the axle is to be strengthened when the tree is to be transported.

In carrying out the invention the truck or vehicle consists of a number of arched bars 10, which are secured upon the forward bolster 11, and the said bolster is in pivotal connection with the forward axle 12. The arched beams 10 are made to diverge at their rear ends and are secured to a divided axle 13, the beams at one side of the center being attached to one portion of the axle and the beams at the opposite side of the center being attached to the opposing section, which leaves a space between the central beam open at the back of the said vehicle, and these beams, preferably at their upper or arched portions, are spaced and connected by cross-bars 14 of any approved construction, the forward cross-bars being carried from one outer side beam to the opposing side beam, and the rear cross-bars are carried from the side beams to the intermediate beams only, so as not to interfere with the central space 15 at the rear of the truck.

At the forward portion of the body a shaft 16 is journaled, provided, preferably, at each end with a crank-arm 17, and upon this shaft, ordinarily between the central and side beams, drums 18 are securely mounted, and upon the said shaft, preferably near one outer end, a ratchet-wheel 19 is secured, engaged by a pawl 20, attached to the frame. Upon each side of the upper or elevated portion of each of the central beams of the body-frame an arched guard 21 is secured, and from each guard a pulley 22 is suspended, and a rope or cable 23 is secured to each drum 18, being carried over one of the upper pulleys 22 and around a second and lower pulley 24, and from this latter pulley the cable is carried upward again around the upper pulley 22, which is a double one, the rear end of the cable being secured to the hanger of the said lower pulley 24. Each lower pulley is provided with a hook 25 or its equivalent, and these hooks are adapted to hold in suspension an expansible or contractible basket A.

The basket is adapted to receive the roots of the tree B to be transported or transplanted, and it is made up of a number of sections 26, the said sections being connected at the bottom by an adjustable band 27, and the said basket is made more or less flaring, being largest at its upper end. Sundry of the sections of the basket are provided with guides 28, and at diametrically opposite sides of the basket a friction-pulley 29 is journaled in a cage 30 or its equivalent, and chains 31 are attached to the hooks of the lower pulleys 24, being passed over the pulleys 29 on the basket and secured at their extremities to a member of the cage, the chains being passed through the guides 28. As shown in the drawings, but one chain may be employed, in which event the chain is simply looped at one side to pass over a hook 25, being attached to the cage at the opposite side, and at both sides passes over the pulleys 29, carried by the cages 30.

The roots of the tree are placed in the basket when expanded, and the tree may be lifted up through the medium of the lifting-cables 23, or other means may be employed, and, after the basket has been placed around the roots and attached to the lifting-cables, by drawing up farther on these cables the members of the basket clamp firmly the roots of the tree and the earth incasing them, thoroughly protecting said roots, and the tree may then be moved from one place to another. By providing the opening 15 at the rear of the truck the latter may be carried up close to the tree, so as to facilitate its removal, and in the event the tree needs to be inclined in passing an overhead obstruction such result may be properly accomplished by means of suitable guy-ropes.

When a tree is to be transported on the improved vehicle, the axle should be strengthened, and this is accomplished, as shown in Fig. 3, by introducing a block 32 between the sections of the axle, which sections have bolts 33 passed through them at their inner ends, and the bolts extend above and below the axle-sections, being provided with polygonal heads. A bar 34, of iron or other spring material, is passed along the top of the inserted block 32 and over the top portions of the axle-sections, the said bar having sockets 35 in its ends, which receive the upper heads of the bolts 33. Bolts 36 are passed through the top bar 34 and likewise through the inserted block 32, and these bolts are also passed through the flattened ends of a turnbuckle 37, which turnbuckle is also provided with sockets at its ends to receive the lower polygonal heads of the axle-bolts 33. The bolts 36, which pass through the turnbuckle, inserted block, and bar 34, have nuts screwed thereon to a bearing upon said bar, the heads of the bolts preferably engaging with the turnbuckle.

Thus it will be observed that when the parts have been placed in position and the turnbuckle is tightened up the turnbuckle and upper bar will draw tightly on the axle-bolts and clamp the axle-sections firmly against the inserted block 32. The said block, together with its attaching device, is removed when the tree is to be taken from the vehicle.

Having thus described my invention, I claim as new and desire to secure by Letters Patent—

1. In a machine for transporting trees, a truck provided with a divided axle and with a brace fitted to and removably held between the sections of said divided axle, substantially as set forth.

2. In a machine for transporting trees, a carriage, a winding mechanism located on the carriage, and a collapsible and expansible basket having compressing devices connected with the said winding mechanism, substantially as set forth.

3. In a machine for transporting trees, a truck provided with a divided axle, a winding mechanism located on the body of the truck, a hoisting mechanism connected with the winding device, and a collapsible and expansible basket, having compressing devices connected with the hoisting mechanism, as and for the purpose specified.

4. In a machine for transporting trees, a truck provided with a divided axle, a block adapted to be introduced between the axle-sections, bolts contained in the axle-sections, extending beyond top and bottom thereof, a bar having sockets receiving the heads of the axle-bolts and extending over the top of the said block, a turnbuckle receiving the lower heads of the axle-bolts, and removable bolts connecting the turnbuckle, inserted block and upper locking-bar, as and for the purpose set forth.

5. In a machine for transporting trees and for similar purposes, a hoisting device, and a basket adapted to be supported by the hoisting device, comprising a series of members having sliding engagement with each other, and a chain extending circumferentially around the basket, guides through which the chain passes, and a connection between the chain and the hoisting devices, as and for the purpose specified.

6. In a machine for transporting trees, a compressible basket combined with a hoisting mechanism applied to and extended from said basket and adapted to compress the same when the hoisting strain is applied, substantially as set forth.

7. In a machine for transporting trees, a compressible basket combined with a hoisting chain or cable extending circumferentially thereof and thence around suitable guides upward, whereby as the hoisting strain is applied, the basket will be compressed, substantially as and for the purpose set forth.

CHARLES O. HALLING.

Witnesses:
OLE BYORUM,
SAMUEL NELSAN.